(12) United States Patent
Fagen et al.

(10) Patent No.: US 8,819,671 B2
(45) Date of Patent: Aug. 26, 2014

(54) FACILITATING SOFTWARE ACQUISITION

(75) Inventors: Scott A. Fagen, Pleasant Valley, NY (US); Petr Plavjanik, Prague (CZ); Lubomir Slivka, Banska Bystrica (SK)

(73) Assignee: CA, Inc., Islandia, NY (US)

( * ) Notice: Subject to any disclaimer, the term of this patent is extended or adjusted under 35 U.S.C. 154(b) by 640 days.

(21) Appl. No.: 12/751,171

(22) Filed: Mar. 31, 2010

(65) Prior Publication Data

US 2011/0246980 A1     Oct. 6, 2011

(51) Int. Cl.
*G06F 9/44* (2006.01)
*G06F 9/445* (2006.01)

(52) U.S. Cl.
CPC ........................................ *G06F 8/61* (2013.01)
USPC ............ 717/174; 717/170; 717/176; 717/178

(58) Field of Classification Search
CPC ............ G06F 11/0709; G06F 11/1433; G06F 11/3093; G06F 8/10; G06F 8/60; G06F 8/61; G06F 8/65; G06F 8/70; G06F 8/71
See application file for complete search history.

(56) References Cited

U.S. PATENT DOCUMENTS

| | | | | |
|---|---|---|---|---|
| 7,222,341 | B2* | 5/2007 | Forbes et al. | 717/170 |
| 2001/0029605 | A1* | 10/2001 | Forbes et al. | 717/170 |
| 2003/0018964 | A1* | 1/2003 | Fox et al. | 717/177 |
| 2004/0003390 | A1* | 1/2004 | Canter et al. | 717/178 |
| 2005/0102665 | A1* | 5/2005 | Barta et al. | 717/174 |
| 2005/0102668 | A1* | 5/2005 | Morgenstern | 717/174 |
| 2005/0144619 | A1* | 6/2005 | Newman | 717/177 |
| 2005/0172285 | A1* | 8/2005 | Bourke-Dunphy et al. | 717/177 |
| 2006/0059481 | A1* | 3/2006 | Smith et al. | 717/173 |
| 2007/0220509 | A1* | 9/2007 | Shwartz et al. | 717/174 |
| 2009/0007097 | A1* | 1/2009 | Hinton et al. | 717/176 |
| 2009/0144726 | A1* | 6/2009 | Felts | 717/174 |
| 2010/0131942 | A1* | 5/2010 | Nannenga et al. | 717/176 |
| 2010/0175060 | A1* | 7/2010 | Boykin et al. | 717/173 |

OTHER PUBLICATIONS

Alan Dearle; Software Deployment, Past, Present and Future; 2007 IEEE; 15 pages; <http://dl.acm.org/citation.cfm?id=1254724>.*
Don Cohen; Automatic Monitoring of Software Requirements; 1997 ICSE; pp. 602-603; <http://dl.acm.org/citation.cfm?id=253493>.*
Richard S. Hall; Software Release Management; 1997 ACM; pp. 159-175; <http://dl.acm.org/citation.cfm?id=267909>.*
David Barrera et al.; Secure Software Installation on Smartphones ; 2011 IEEE; 8 pages; <http://people.scs.carleton.ca/~paulv/davidb.pdf>.*
Hongbo Tian et al.; A Novel Software Deployment Method based on Installation Packages; 2010 IEEE; pp. 228-233; <http://ieeexplore.ieee.org/stamp/stamp.jsp?tp=&arnumber=5562875>.*
T. Coupaye et al.; Foundations of Enterprise Software Deployment; 2000 software Maintenance and Reengineering9 pages; <http://ieeexplore.ieee.org/stamp/stamp.jsp?tp=&arnumber=827313>.*

(Continued)

*Primary Examiner* — Thuy Dao
*Assistant Examiner* — Cuong V Luu
(74) *Attorney, Agent, or Firm* — Baker Botts, LLP (57) ABSTRACT

In certain embodiments, facilitating software acquisition includes accessing a memory storing software programs. A selected software program is identified. One or more product requirements of the selected software program and one or more target parameters of a target environment for the selected software program are determined. One or more commands to install the selected software program at the target environment according to the product requirements and the target parameters are determined.

18 Claims, 4 Drawing Sheets

(56) References Cited

OTHER PUBLICATIONS

Harris, Judy Washo, "*Vita-meata-vegamin for your zSeries system Introducing IBM Electronic Service Agent*", z/OS Hot Topics Newsletter, Issue 12, pp. 15-17, Feb. 2005.

"*IBM SMP/E for z/OS V3.4 integrates ordering and delivery of z/OS platform service over the Internet*", Software Announcement, http://www.ibm.com, 3 pages, Jul. 27, 2005.

"*IBM US Announcement Supplemental Information*", http://www.ibm.com, 3 pages, Jul. 27, 2005.

"*CustomPac services*", IBM CustomPac, https://www-03.com/services/ca/en/custompac/, 2 pages, Printed Oct. 20, 2010.

"*SystemPac*", IBM CustomPac, https://www-03.ibm.com/services/ca/en/custompac/deliverable/systempac.html, 2 pages, Printed Oct. 20, 2010.

"*IBM SystemPac or ServerPac*", WebSphere Application Server Version 6.0.2, http://publib.boulder.ibm.com/infocenter/wasinfo/v6r0/index.jsp?topic=/com.ibm.websph . . . 1 page/, Printed Oct. 20, 2010.

* cited by examiner

FACILITATING SOFTWARE ACQUISITION

TECHNICAL FIELD

This invention relates generally to the field of computing systems and more specifically to facilitating software acquisition.

BACKGROUND

A software producer may make software available to a consumer. The consumer may then download the software. Downloading the software typically involves an installation process that may require specific programming skills.

SUMMARY OF THE DISCLOSURE

In accordance with the present invention, disadvantages and problems associated with previous techniques for acquiring software may be reduced or eliminated.

In certain embodiments, facilitating software acquisition includes accessing a memory storing software programs. A selected software program is identified.

One or more product requirements of the selected software program and one or more target parameters of a target environment for the selected software program are determined. One or more commands to install the selected software program at the target environment according to the product requirements and the target parameters are determined.

Certain embodiments of the invention may provide one or more technical advantages. A technical advantage of one embodiment may be that product requirements of a selected software program and target parameters of a target environment are determined. The selected software program may then be installed at the target environment according to the product requirements and the target parameters.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 3E of the drawings, like numerals being used for like and corresponding parts of the various drawings.

Figure 1:
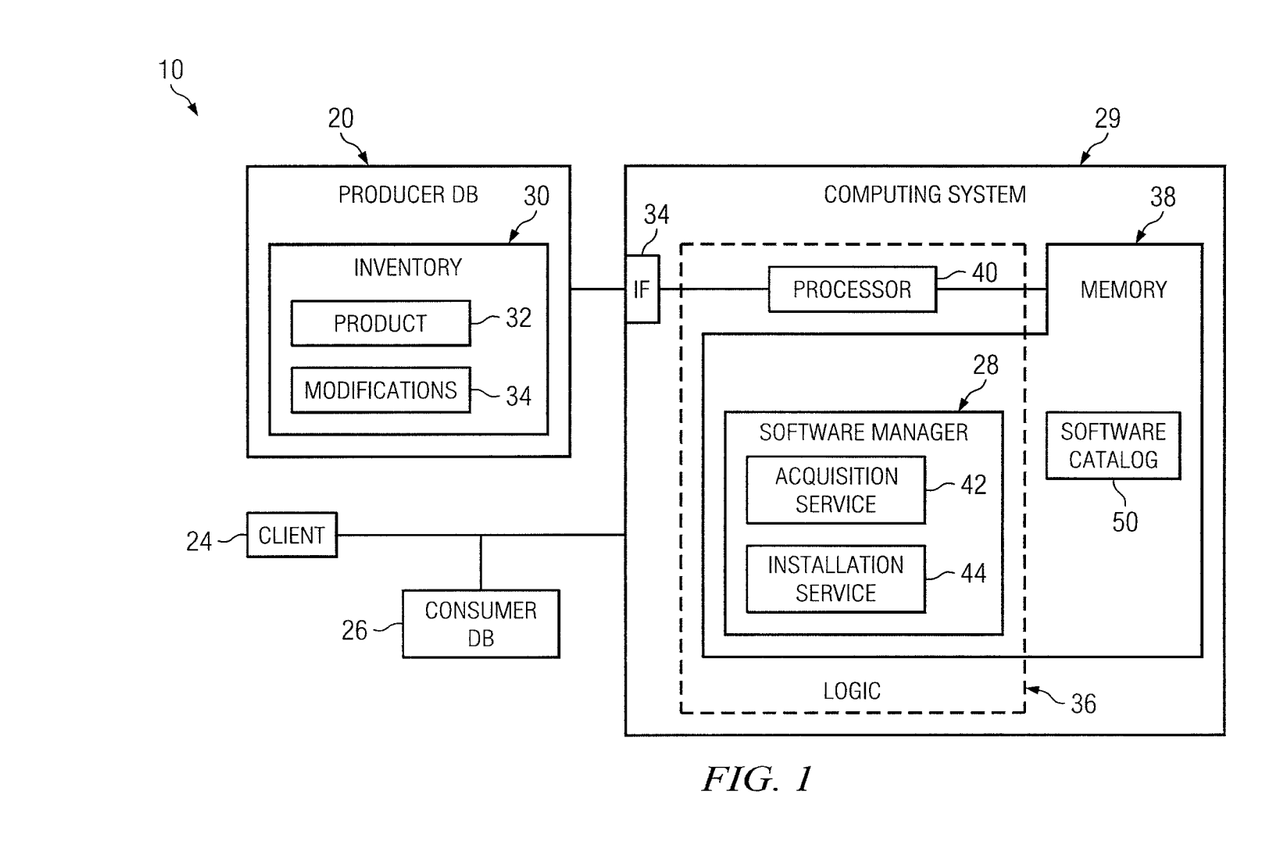
FIG. 1 illustrates an example of a system that facilitates software acquisition.

FIG. 1 illustrates an example of a system 10 that facilitates software acquisition. In certain embodiments, system 10 accesses a software inventory that comprises software programs. System 10 identifies a selected software program and determines one or more product requirements of the selected software program and one or more target parameters of a target environment for the selected software program. System 10 automatically facilitates placement of the selected software program at the target environment according to the product requirements and the target parameters In certain embodiments, system 10 may identify a selected software program from a software catalogue. System 10 may determine product requirements and target parameters from any suitable information, for example, from metadata of a package that includes the software program and/or from user input. System 10 may facilitate placement of the selected software program by generating one or more commands. The commands may invoke utilities to create data sets and/or create files to contain the installed program, and/or may invoke utilities to transform the software program into executable programs.

In the illustrated embodiment, system 10 includes a producer database 20, a client 24, a consumer database 26, and a computing system 29. Producer database 20 stores an inventory 30 that includes software products 32 and modifications 34. Computing system 29 includes an interface 34, logic 36, and a memory 38. Logic 36 includes a processor 40 and a software manager 28 that includes an acquisition service 42 and an insulation service 44. Memory 38 stores software manager 28 and a software catalog 50.

A client 24 may comprise a computing system that allows a consumer to access software manager 28 of a computing system 29 to download software to consumer database 26. Software manager 28 may present information to a user through client 24. In certain embodiments, the presentation may involve software manager 28 facilitating a display of information on client 24. In certain examples, the user may select options presented in the information.

Producer database 20 stores software inventory 30. Software inventory 30 may comprise software programs, or software, that the producer may provide to the consumer. Software may include software products 32 and/or product modifications 34. A modification may add to, remove from, change, or otherwise modify a software product. Examples of software modifications include patches, program temporary fixes (PTFs), updates, enhancements, maintenance packages. Inventory 30 may comprise any suitable software, such as mainframe software, for example, z/OS mainframe software.

Files may be used to control how the software is constructed for execution at consumer database 26. Modification Control Statement (MCS) files declare the elements and attributes of the software. Relative files (RELFILEs) comprise the product elements (for example, programs, tables, and samples).

Schema (such as XML encoding schema) may be used as metadata to describe the characteristics of software for its installation, deployment, configuration, and/or maintenance. Examples of schema are those defined by a Solution Deployment Descriptor (SDD), such as the OASIS SDD. A schema may describe the resources required from the consumer. Resources may include the mainframe. Mainframe related specifics may include management class, storage class, volume serial, device type, data class, space units, average record unit, primary quantity, secondary quantity, directory blocks, record format, record length, block size, data set name type, and/or other suitable feature. Dataset details may include names of the directories and/or privileges for a directory.

In certain embodiments, an SDD descriptor may have extensions that describe mainframe software installation characteristics. These characteristics may be consumer information associated with a particular software installation. This information may differ from consumer to consumer and installation to installation. Examples of such consumer information include how much space to allocate for the inventory, which storage pools should be used for the target libraries, what software can share a single inventory, and what software cannot share a single inventory. Extensions may be used to define product requirements, discover available resources, describe mainframe specifics, and/or invoke a System Modification Program (SMP) (such as SMP/E of IBM SYSTEMS) for the particular installation.

Consumer database 26 stores software installed by software manager 28. In certain embodiments, distribution and target libraries hold the elements of the system. Distribution libraries comprise elements (for example, modules and macros) that are used as input for running a system. Target libraries comprise executable code used to run a system (for example, a production or test system).

A software inventory data set may control the acquisition process and track the libraries. An example of a software inventory data set may be a consolidated software inventory (CSI) data set of a System Modification Program/Extended (SMP/E).

A software inventory data set can be divided into multiple partitions, or zones. Zones may include a global zone, one or more target zones, and/or one or more distribution zones. A global zone may record information about software changes (such as system updates) that have been received into the data set. The changes may be made to the state of the software in the distribution and target zones. The global zone may include information that enables access to the other types of zones. A target zone may include entries representing elements found in the target libraries and may record information about the status and structure of the operating system (or target) libraries. A distribution zone may include entries representing elements found in the distribution libraries and may record information about the status and structure of the distribution libraries.

Software manager 28 determines requirements for acquiring software and discovers the resources of the consumer to fulfill the requirements. In certain embodiments, acquisition service 42 logs into online support on behalf of the consumer and scans for newly available files. Acquisition service 42 compares the software that has been installed with the software that is available. If available software has not been installed, acquisition service 42 presents that in the status. Acquisition service 42 then updates software catalog 50 with knowledge of the new files.

In certain embodiments, acquisition service 42 downloads a file to determine product requirements, such as requirements for downloading software. Examples of product requirements include allocation parameters for a CSI, distribution libraries, and/or target libraries; software that may be required or may be optional for installation; libraries required for installation; and/or other requirements. The file may be compressed using any suitable protocol, for example, zip. Acquisition service explodes the file. Acquisition service 42 may then determine product requirements in any suitable manner, for example, by looking at metadata, for example, XML metadata. The requirements are then used in installation service 44.

Installation service 44 manages the interactions between the software and consumer database 26. Installation service 44 processes product metadata to confirm that the target environment is appropriate for the software. Installation service 44 also confirms that resources satisfy the appropriate requirements for installation. Software manager 28 may use any suitable code to execute SMP. For example, software manager may use native code and/or java code to invoke SMP.

Software catalog 50 maintains a record of the files. Software catalog 50 maintains linkages between the products and consumer databases 26 managed by software manager 28.

Figure 2:
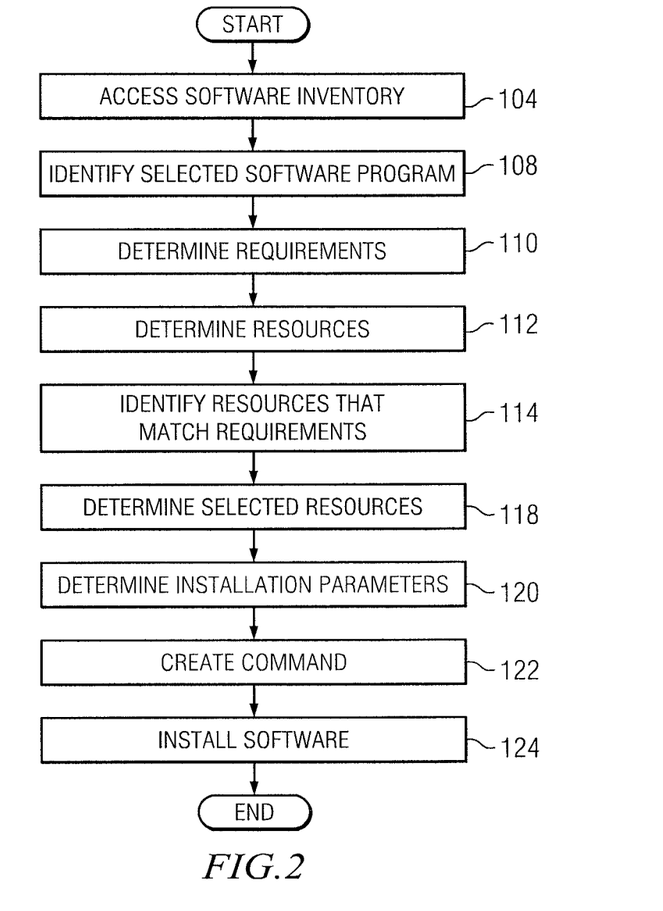
FIG. 2 illustrates an example of a method for facilitating software acquisition.

FIG. 2 illustrates an example of a method for facilitating software acquisition. In certain embodiments, software manager 28 accesses a software inventory 30 at step 104. A selected software program is identified at step 108. A selected software program may be identified by determining one or more available software programs, facilitating presentation of the available software programs to allow for selection of the selected software program, and determining that the selected software program has been selected.

In certain embodiments, available software programs may be programs that a consumer is authorized to download. Available software programs may also be programs that the consumer has not already downloaded. Presentation of the available software programs or other suitable information may be facilitated by sending information to client 24 that allows client 24 to display the available software programs (or other suitable information) as selectable options in a graphical user interface at client 24. The selected software program (or other suitable candidate) may be determined to have been selected by determining that a user has selected the option corresponding to the selected software (or other suitable candidate).

Requirements for the software are determined at step 110. The requirements may be determined from metadata of the software. The metadata may be expressed in SDD definitions of the parameters.

Resources of the consumer are determined at step 112. Resources may be target environments of the consumer and may be described by target parameters. Resources that match the requirements of the software are identified at step 114. The resources that match the parameters extracted from the SDD may be identified as resources that match the requirements.

In certain embodiments, target environments may be identified. A first subset and a second subset of the target environments may be determined. The first subset may be appropriate for a selected software program, and the second subset may not be appropriate for the selected software program according to the product requirements of the selected software program. Presentation of the first subset, but not the second subset, may be facilitated.

For example, one or more appropriate target features, such as target repositories, target zones, and/or distribution zones, may be determined according to the product requirements of the selected software program. Appropriate target features may be target features that are valid for a particular product. Presentation of the appropriate target repositories, target zones, and/or distribution zones may then be facilitated. Examples of target repositories, target zones, and/or distribution zones are described in more detail with reference to FIG. 3C. In certain embodiments, a new target environment, such as a new target repository, target zone, and/or distribution zone, may be created by a user.

Resources selected by a user are determined at step 118. The selected resources may be determined by determining resources corresponding to options selected by the user. In certain embodiments, target parameters may be used to describe the selected resources.

Installation parameters are determined at step 120. Installation parameters may be product required or user selected parameters that are applied to software installation. For example, determining installation parameters may comprise determining appropriate installation types according to the product requirements of the selected software program and facilitating presentation of the appropriate installation types to allow for selection of an appropriate installation type. As another example, determining installation parameters may comprise determining one or more installation prerequisites according to the product requirements of the selected software program and facilitating presentation of the installation prerequisites. Examples of installation types and installation prerequisites are described in more detail with reference to FIG. 3C.

One or more commands are created to facilitate installation of the software, for example, allocate the resources at step 122. A command may execute live on the mainframe and may use native code in order to install the software on the mainframe. The software is installed according to the commands using the allocated resources at step 124. In certain embodiments, the software may be installed by accessing and processing an installation artifact. Installation may include creating a CSI, allocating a dataset, initializing the CSI, and executing an SMP/E to update the CSI.

Software manager 28 may perform other suitable operations. In certain embodiments, software manager 28 may determine available software modifications according to a software catalog and facilitate presentation of the available software modifications to allow for selection of an available software modification.

Figure 3A:
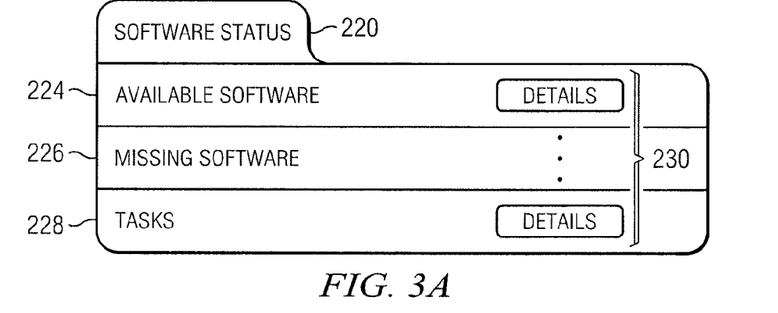
FIGS. 3A through 3E illustrate examples of windows for a software manager graphical user interface (GUI).

FIGS. 3A through 3E illustrate examples of windows for a software manager GUI. FIG. 3A illustrates an example of a software status window 220. Software status window 220 describes the status of software and may include any suitable sections. Examples of software status sections may include available software 224, missing software 226, and tasks 228 sections.

Available software section 224 describes software that is available to the consumer. In certain embodiments, the software may include products and/or product modifications such as updates. Missing software section 226 may include software, such as updates or maintenance, that software of software catalog 50 may require. For example, missing software 226 may indicate missing product changes of SMP/E environments. Tasks section 228 may describe tasks such as active downloads, installations, or deployment tasks. Tasks section 228 may also indicate if there are tasks that are waiting for user input or that are in error.

Software status window 220 may also include one or more details selectors 230 that may be selected in order to provide more information about status information that has been presented. For example, a details selector 230 may be selected in order to present information about available software 224, missing software 226, or tasks 228.

Figure 3B:
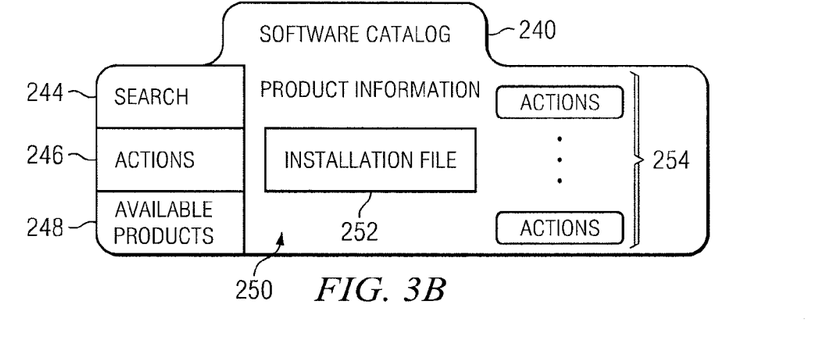

FIG. 3B illustrates an example of a software catalog window 240. Software catalog window 240 describes software catalog 50 and may include any suitable sections. In the illustrated embodiment, software catalog 240 includes a search section 244, an action section 246, and available products section 248, and a vendor section 250.

Search section 244 allows a user to search software catalog 50. In certain embodiments, a user may enter a search term into a search window in order to conduct the search. Actions section 246 include actions that may be performed with respect to software catalog 50. In certain embodiments, actions may include update catalog, show license keys, insert new product, and install external package actions. Available products section 248 may describe the products available in software catalog 50.

Product information section 250 displays information about products displayed in available products 248. In certain embodiments, a product may be selected in the available products section 248, and software manager 228 presents information about the product in product information section 250. For example, selecting a product may display installation artifacts of the product. Examples of installation artifacts (or other metadata) include SMP/E functions delivered by the product installation (which may be described by function type, name, and/or description); SMP/E products delivered by the product installation (which may be described by product type, product code, release, and/or description); and/or SMP/E elements delivered by the product installation (which may be described by element type, name, and/or size). Product information section 250 may also include one or more actions 254. An action selector 244 may be used to display one or more actions that may be performed on the installation file. Examples of actions include installing and/or deleting a file. In certain embodiments, selecting an install action may initiate an installation wizard.

Figure 3C:
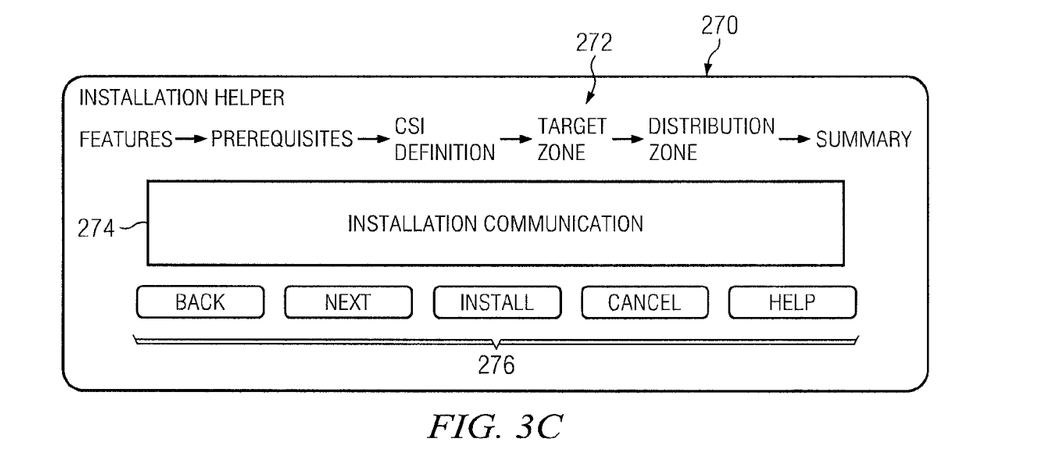

FIG. 3C illustrates an example of an installation wizard 270. Installation wizard 270 may be used to obtain user input to install software in consumer database 26. Installation wizard 270 may display any suitable information, for example, a status bar 272, an installation communication window 274, and installation selectors 276.

Status bar 272 indicates the current stage of the process of obtaining user input. Installation communication window 274 may be used to present information about the installation process. In certain embodiments, communication window 274 may provide options for the user to select. Installation selectors 276 may be used to move among the different stages of the installation. Examples of installation selectors 276 includes a back, next, install, cancel, and help selector.

In certain embodiments, the stages may include features, prerequisites, CSI definition, target zone, distribution zone, and summary stages. At the features stage, communication window 274 presents types of installation that may be selected. Installation types represent sets of predefined product features. Examples of installation types may include a base installation, one or more specialized installations, and a custom installation. Selection of an installation type may then move the process to prerequisite stage.

At the prerequisite stage, communication window 274 may display prerequisites that may be required to be installed in order to install the selected software. The prerequisites may be determined from metadata extracted from the SDD of the selected product. Examples of prerequisites may include products and/or functions. Satisfaction of the prerequisites may move the process to the CSI definition stage.

At the CSI definition stage, target repository options may be presented. In certain embodiments, software manager 28 may identify target repositories that match the requirements of the selected software.

The target repository options may also include an option to create a new target repository. If the option to create a new target repository is selected, communication window 274 may display a window into which parameters used to create the new target repository may be entered. Target parameters may include CSI Virtual storage access method (VSAM) parameters (for example, name, date set name prefix, catalog, cross region, and cross system) and/or SMP/E dataset allocation parameters (for example, high-level qualifier, Data Source Name (DSN) type, Systems Management Server (SMS) parameters or dataset parameters). SMS parameters may include storage class and management class parameters, and dataset parameters may include volume, serial and unit parameters.

Communication window 274 may allow for entry of additional parameters for override of allocation parameters of datasets. Completion of the target repository definition may move the process to the target zone stage.

At the target zone stage, communication window 274 may present target zone options that may be selected. Software manager 28 may identify target zones that match requirements and present those as options. Target zone options may also include an option to create a new target zone. Selection of the option to create a new target zone may bring up fields into which target parameters may be entered. Target parameters may be similar to the ones presented during a target repository definition. After the target zone stage, the method may proceed to a distribution zone stage.

The distribution zone stage may be substantially similar to the target zone stage. The distribution stage allows the user to select a distribution zone. The process then proceeds to the summary stage. The summary stage presents a summary of the installation selections. In certain embodiments, a summary may include selected installation types, selected target repositories, target zones, and distribution zones.

Install selector 276 may be selected in order to install the software as described in the summary. Communication window 274 may show the progress of the installation. In certain embodiments, the stages of the installation may include pre-installation report, CSI creation, dataset allocation, CSI initialization, SMP/E execution, post-installation CSI update, repository manager update, and post-installation cleanup. After installation, communication window 274 may allow user to select detailed output for each stage of the installation.

Figure 3D:
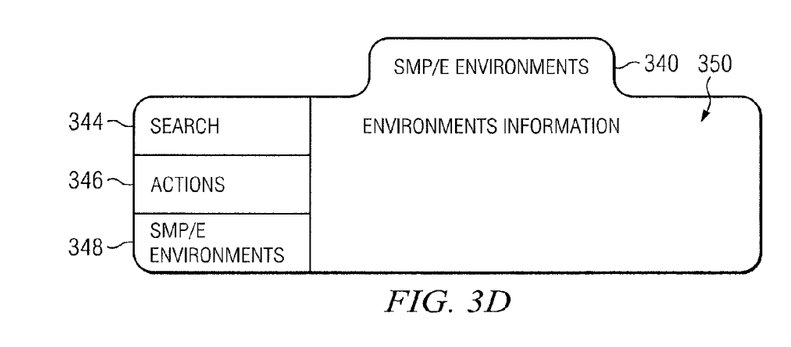

FIG. 3D illustrates an example of an SMP/E environments window 340. SMP/E environments window 340 describes the SMP/E environments and may include any suitable sections. In certain embodiments, SMP environments window 340 may include a search section 344, an action section 346, an environment section 348, and an environment information section 350.

Search section 344 allows a user to search the environments. Actions section 346 allows a user to perform actions on the environments. Examples of actions include migration of an existing SMP/E CSI. An SMP environment section 348 lists the SMP/E environments. Environment information 350 displays information about the environments listed in the environments section 348.

Information may be presented if an environment is selected. Environment information 350 may include installed products, CSI information, and maintenance information. Installed products may list the products installed in a particular environment. CSI information may describe the particular environment. Maintenance information may include maintenance packages available for a particular environment.

In certain examples, maintenance packages may be presented, and an action selector may be selected in order to install the maintenance package. Selection of a maintenance package to install may initiate a maintenance wizard.

Figure 3E:
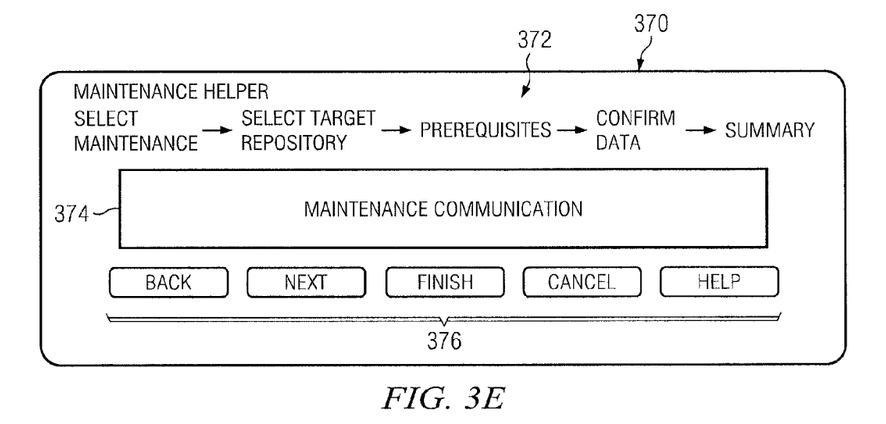

FIG. 3E illustrates an example of a maintenance wizard 370. Maintenance wizard 370 may be used to install a maintenance package and may include any suitable sections. In certain embodiments, maintenance wizard 370 includes a status bar 372, a maintenance communication window 374, and maintenance selectors 376. Status bar 372 indicates the stages of the process of obtaining selections from a user. Maintenance communication window 374 provides information about process and may be used to obtain user selections.

Examples of stages include select maintenance, select target repository, prerequisites, confirm data, and summary stages. At the select maintenance stage, software manager may present available maintenance packages. Software manager 28 may determine the available maintenance packages by identifying products in software catalog 50 and determining whether maintenance packages for the identified products are available. At the select target repository stage, the user may select the target repository. The process may be substantially similar to the select target repository stage of the installation process.

At the prerequisite stage, software manager 28 determines and displays the prerequisites. Prerequisites may be software that is required to be installed with the maintenance package. At the confirm data stage, hold data may be confirmed. At the summary stage, a summary of the selected options is selected.

The install selector may be selected in order to install the maintenance package. Communication window 374 may present the progress of the installation. Stages of the installation may include maintenance pre-installation report, maintenance package extraction, maintenance reception, maintenance application, and temporary data release. The user may select a stage in order to get more details about the process. The graphical user interface may include any other suitable windows. For example, the GUI may include a tasks window that displays a summary of tasks that have been performed.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

A component of the systems and apparatuses described herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or or encoded with a computer program and/or having a stored and/or an encoded computer program.

A memory stores information. A memory may comprise one or more non-transitory, tangible, computer-readable, and/or or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    accessing a memory storing a plurality of software programs;
    identifying a selected software program of the plurality of software programs;
    determining one or more product requirements of the selected software program;
    generating a software inventory for a target environment;
    determining one or more target parameters of the target environment that match the one or more product requirements of the selected software program, wherein determining the one or more target parameters comprises:
        determining one or more appropriate target zones in the software inventory of the target environment, wherein the appropriate target zones are determined according to the product requirements of the selected software program, and wherein the appropriate target zones each comprise information about structure of operating system libraries on the target environment that correspond to the product requirements of the selected software program;
        determining one or more appropriate distribution zones in the software inventory of the target environment, wherein the appropriate distribution zones are determined according to the product requirements of the selected software program, and wherein the appropriate distribution zones each comprise an index of distribution libraries on the target environment that correspond to the product requirements of the selected software program; and
        facilitating presentation of the appropriate distribution zones and the appropriate target zones to allow for selection of an appropriate target repository, wherein the appropriate target repository is associated with a selected distribution zone and a selected target zone; and
    determining one or more commands to install the selected software program at the target repository according to the product requirements and the target parameters.

2. The method of claim 1, the identifying the selected software program further comprising:
    determining one or more available software programs from the plurality of software programs;
    facilitating presentation of the available software programs to allow for selection of the selected software program; and
    determining that the selected software program has been selected.

3. The method of claim 1, further comprising:
    determining one or more appropriate installation types according to the product requirements of the selected software program; and
    facilitating presentation of the appropriate installation types to allow for selection of an appropriate installation type.

4. The method of claim 1, further comprising:
    determining one or more installation prerequisites according to the product requirements of the selected software program; and
    facilitating presentation of the installation prerequisites.

5. The method of claim 1, the determining the one or more target parameters further comprising:
    identifying a plurality of target environments;
    determining a first subset and a second subset of the target environments, the first subset appropriate for the selected software program and each target environment in the second subset lacking at least one of the product requirements of the selected software program, the first subset comprising the target environment; and
    facilitating presentation of the first subset, but not the second subset, to allow for selection of the target environment from the first subset.

6. The method of claim 1, the determining one or more target parameters further comprising:
    determining one or more appropriate target repositories according to the product requirements of the selected software program; and
    facilitating presentation of the appropriate target repositories to allow for selection of an appropriate target repository.

7. The method of claim 1, the determining one or more target parameters further comprising:
    determining a software change to the appropriate target zone; and
    modifying the one or more target parameters based on the software change.

8. The method of claim 1, the determining one or more target parameters further comprising:
    facilitating creation of a new target environment.

9. The method of claim 1, further comprising:
    determining one or more available software modifications according to a software catalog; and
    facilitating presentation of the available software additions to allow for selection of an available software addition.

10. One or more non-transitory computer-readable media storing one or more instructions when executed by a computer operable to:
    access a memory storing a plurality of software programs;
    identify a selected software program of the plurality of software programs;
    determine one or more product requirements of the selected software program;
    generate a software inventory for a target environment;
    determine one or more target parameters of the target environment that match the one or more product requirements of the selected software program, wherein determining the one or more target parameters comprises:
        determining one or more appropriate target zones in the software inventory of the target environment, wherein the appropriate target zones are determined according to the product requirements of the selected software program, and wherein the appropriate target zones each comprise information about structure of operating system libraries on the target environment that correspond to the product requirements of the selected software program;
        determining one or more appropriate distribution zones in the software inventory of the target environment, wherein the appropriate distribution zones are determined according to the product requirements of the selected software program, and wherein the appropriate distribution zones each comprise an index of distribution libraries on the target environment that correspond to the product requirements of the selected software program; and facilitating presentation of the appropriate distribution zones and the appropriate target zones to allow for selection of an appropriate target repository, wherein the appropriate target repository is associated with a selected distribution zone and a selected target zone; and determine one or more commands to install the selected software program at the target repository according to the product requirements and the target parameters.

11. The computer-readable media of claim 10, the identifying the selected software program further comprising:

determining one or more available software programs from the plurality of software programs;

facilitating presentation of the available software programs to allow for selection of the selected software program; and determining that the selected software program has been selected.

12. The computer-readable media of claim 10, further operable to:

determine one or more appropriate installation types according to the product requirements of the selected software program; and facilitate presentation of the appropriate installation types to allow for selection of an appropriate installation type.

13. The computer-readable media of claim 10, further operable to:

determine one or more installation prerequisites according to the product requirements of the selected software program; and facilitate presentation of the installation prerequisites.

14. The computer-readable media of claim 10, the determining the one or more target parameters further comprising:

identifying a plurality of target environments;

determining a first subset and a second subset of the target environments, the first subset appropriate for the selected software program and each target environment in the second subset lacking at least one of the product requirements of the selected software program, the first subset comprising the target environment; and facilitating presentation of the first subset, but not the second subset, to allow for selection of the target environment from the first subset.

15. The computer-readable media of claim 10, the determining one or more target parameters further comprising:

determining one or more appropriate target repositories according to the product requirements of the selected software program; and facilitating presentation of the appropriate target repositories to allow for selection of an appropriate target repository.

16. The computer-readable media of claim 10, the determining one or more target parameters further comprising:

determining a software change to the appropriate target zone, and modifying the one or more target parameters based on the software change.

17. One or more non-transitory computer-readable media storing one or more instructions when executed by a computer operable to:

access a memory storing a plurality of software programs;

identify a selected software program of the plurality of software programs;

determine one or more product requirements of the selected software program;

generate a software inventory for a target environment;

determine one or more target parameters of a target environment that match the one or more product requirements of the selected software program by identifying a plurality of target environments, wherein determining the one or more target parameters comprises:

determining one or more appropriate target zones in the software inventory of the target environment, wherein the appropriate target zones are determined according to the product requirements of the selected software program, and wherein the appropriate target zones each comprise information about structure of operating system libraries on the target environment that correspond to the product requirements of the selected software program;

determining one or more appropriate distribution zones in the software inventory of the target environment, wherein the appropriate distribution zones are determined according to the product requirements of the selected software program, and wherein the appropriate distribution zones each comprise an index of distribution libraries on the target environment that correspond to the product requirements of the selected software program; and facilitating presentation of the appropriate distribution zones and the appropriate target zones to allow for selection of an appropriate target repository, wherein the appropriate target repository is associated with a selected distribution zone and a selected target zone;

determine one or more installation prerequisites according to the product requirements of the selected software program; and determine one or more commands to install the selected software program at the target repository according to the product requirements and the target parameters.

18. The non-transitory computer-readable media of claim 17, the identifying the selected software program further comprising:

determining one or more available software programs from the plurality of software programs;

facilitating presentation of the available software programs to allow for selection of the selected software program; and determining that the selected software program has been selected.

* * * * *